(12) United States Patent
Sauer et al.

(10) Patent No.: US 8,238,594 B2
(45) Date of Patent: Aug. 7, 2012

(54) FRONT PLATE WITH SEALING APPARATUS

(75) Inventors: Joseph Sauer, Strullendorf (DE);
Benjamin Schmidt, Nürnberg (DE);
Christian Schmitt, Grossenseebach (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 704 days.

(21) Appl. No.: 12/315,310

(22) Filed: Dec. 2, 2008

(65) Prior Publication Data

US 2009/0147978 A1 Jun. 11, 2009

(30) Foreign Application Priority Data

Dec. 7, 2007 (DE) .................... 10 2007 058 987

(51) Int. Cl.
*H04R 25/00* (2006.01)
(52) U.S. Cl. ........................................ 381/326
(58) Field of Classification Search ............ 381/326
See application file for complete search history.

(56) References Cited

U.S. PATENT DOCUMENTS

| | | | |
|---|---|---|---|
| 4,972,488 A | | 11/1990 | Weiss et al. |
| 5,864,628 A | * | 1/1999 | Posen et al. .............. 381/325 |
| 6,105,713 A | * | 8/2000 | Brimhall et al. .......... 181/135 |
| 6,795,562 B1 | * | 9/2004 | Gunnersen et al. ........ 381/325 |
| 7,013,016 B2 | * | 3/2006 | Wolf ......................... 381/324 |
| 7,058,192 B2 | * | 6/2006 | Muller et al. ............. 381/326 |
| 7,313,245 B1 | * | 12/2007 | Shennib .................... 381/325 |
| 7,421,087 B2 | * | 9/2008 | Perkins et al. ............ 381/331 |
| 7,551,747 B2 | * | 6/2009 | Huynh et al. ............. 381/325 |
| 7,558,394 B2 | * | 7/2009 | Tilson et al. .............. 381/325 |

FOREIGN PATENT DOCUMENTS

| | | |
|---|---|---|
| DE | 84 36 783 U1 | 5/1986 |
| DE | 10 2007 053 540.8 | 11/2008 |
| EP | 0 310 866 A1 | 4/1989 |
| EP | 1 439 733 A1 | 7/2004 |
| EP | 1 458 217 A2 | 9/2004 |

\* cited by examiner

*Primary Examiner* — Eugene Lee

(57) ABSTRACT

The invention specifies a sealing apparatus for a microphone opening in a front plate. It comprises a sound-permeable covering medium made of a first material and a sound-permeable membrane, with a sealant arranged on the exterior of the covering medium made of a second material being designed so as to produce a tight form fit between the covering medium and the front plate when said covering medium is inserted into the microphone opening. A front plate that is compatible with the sealing apparatus according to the invention is also specified. The advantage here is that the microphone opening can be sealed in a water-tight fashion and as a result protects a microphone positioned beneath it against external influences.

11 Claims, 5 Drawing Sheets

FRONT PLATE WITH SEALING APPARATUS

CROSS REFERENCE TO RELATED APPLICATIONS

This application claims the benefits of German application No. 10 2007 058 987.7 filed Dec. 7, 2007 and is incorporated by reference herein in its entirety.

FIELD OF INVENTION

The invention relates to a sealing apparatus for a front plate of an in-the-ear hearing device or of an earmold piece of a behind-the-ear hearing device and a hearing device.

BACKGROUND OF THE INVENTION

In the case of in-the-ear hearing devices, components such as a microphone, amplifier or loudspeaker are integrated in a housing shell of an earmold piece, said housing shell being shaped to suit the auditory canal of the hearing device wearer. The housing shell is sealed on the front side with a front plate in which is arranged for example a microphone opening for allowing through the sound to be recorded.

In order to prevent the penetration of cerumen and moisture into the interior of the hearing device all openings, in particular the microphone opening, must be sealed with suitable sound-permeable media.

The utility model DE G 84 36 783 discloses a protective device for the penetration of cerumen consisting of perforated caps that can be attached to the sound exit nozzles either directly in an in-the-ear hearing device or to an earmold piece of a behind-the-ear hearing device that can be inserted into the ear.

The patent specification EP 0 310 866 A1 describes an apparatus for sealing openings in hearing devices or in earmold pieces for hearing devices, in particular openings in a front cover for sound entry, sound exit or aeration. The sealing apparatus cited comprises inter alia a cap that can be screwed on or snapped on. A microporous membrane of non-adhesive material can be inserted into the corresponding opening.

Front plates or front covers, also known as faceplates, are today normally cast in plastic or constructed from one or several plastics in a stereo lithography system. In the patent specification DE 10 2007 053 540.8 subsequently published by the applicant, such faceplates and associated housing modules and their manufacture are described.

U.S. Pat. No. 4,972,488 describes various protective caps for preventing the penetration of earwax into the acoustic output behind the receiver in an in-the-ear hearing device. The protective cap has several calotte-shaped flanges on its outside that engage with a notch in a housing shell and can thus produce a form fit.

Furthermore EP 1458217 A2 specifies an acoustic filter element that can be inserted into an acoustic output opening of a hearing device. A membrane made of plastic has a collar-shaped section with openings to allow sound to pass through, with said section being surrounded by a ring-shaped section.

Furthermore EP 1439733 A1 discloses a microphone protection system made of plastic and consisting of a ring with bars that run to its center and there connect with one another, with an opening being formed between the ring and the bars. An additional filter is provided in the vicinity of the openings of the microphone protection system.

SUMMARY OF INVENTION

An object of the invention is to specify a further sealing apparatus that can be easily and cost-effectively manufactured and that securely protects a microphone opening against the penetration of moisture and cerumen. The inventive apparatus should also be suitable for installation in a front plate that can be manufactured using an injection molding method.

In accordance with the invention the object set is achieved with the apparatus of the claims, whereby a sealing apparatus for a microphone opening of a front plate comprises a sound-permeable covering medium made of a first material and a sound-permeable membrane. A sealant made of a second material is arranged on the exterior of the covering medium. The sealant effects a tight form fit between the covering medium and the front plate when the covering medium is inserted into the microphone opening.

This has the advantage of a sealing apparatus that can be manufactured simply and inexpensively, which can be removably and tightly inserted into a microphone opening.

In a development the form fit can be air- and water-tight and the membrane can be made of a microporous and water-repellent material.

As a result neither water vapor nor cerumen can reach the interior of a hearing device.

In a further embodiment of the invention the covering medium can be circular-cylindrical in shape and the sealant can comprise a sealing ring that surrounds the covering medium.

This has the advantage that circular microphone openings can be sealed securely and tightly, and the microphone situated below is protected against external influences.

In a development the sealant can be connected inseparably to the covering medium.

As a result the sealant cannot be removed from the covering medium and is tight with the covering medium in a form-fit manner.

Moreover the second material can consist of silicon.

The advantage here is that the sealant can easily thus be manufactured together with the covering medium in a 2-component injection molding method.

In a further embodiment the covering medium can have a first notch for receiving the sealant.

This improves the sealant's fit on the covering medium.

In a development the membrane can be bonded to the underside of the covering medium.

In this way the membrane is positioned tightly against the covering medium.

The covering medium can also have several openings running through it.

Sound waves can travel virtually unimpeded through these openings to the sealing membrane and can reach the interior of a hearing device.

In a further embodiment the covering medium can have an external thread or one or several snap connectors on the underside of the covering medium for affixing in the microphone opening.

The advantage here is that the sealing medium can be removed from the microphone opening in a non-destructive fashion.

A further object of the invention is to specify a front plate that is compatible with the sealing apparatus according to the invention.

In accordance with the invention the object set is achieved by a microphone opening of a front plate being realized such that, following the insertion of a sealing apparatus according to the invention into the microphone opening, the sealant produces a form fit with the receiving medium.

This has the advantage that the front plate and the sealing apparatus fit together in an optimal fashion.

In a development the form fit can be removable so that the sealing apparatus can be removed in a non-destructive fashion.

Furthermore the microphone opening can have a second notch for receiving the sealant.

As a consequence the sealant closes off optimally.

The invention also comprises a hearing device having a sealing apparatus according to the invention and a front plate according to the invention.

BRIEF DESCRIPTION OF THE DRAWINGS

Further specific features of the invention will be apparent from the following explanations of several exemplary embodiments with reference to schematic drawings, in which.

DETAILED DESCRIPTION OF INVENTION

Figure 1A:
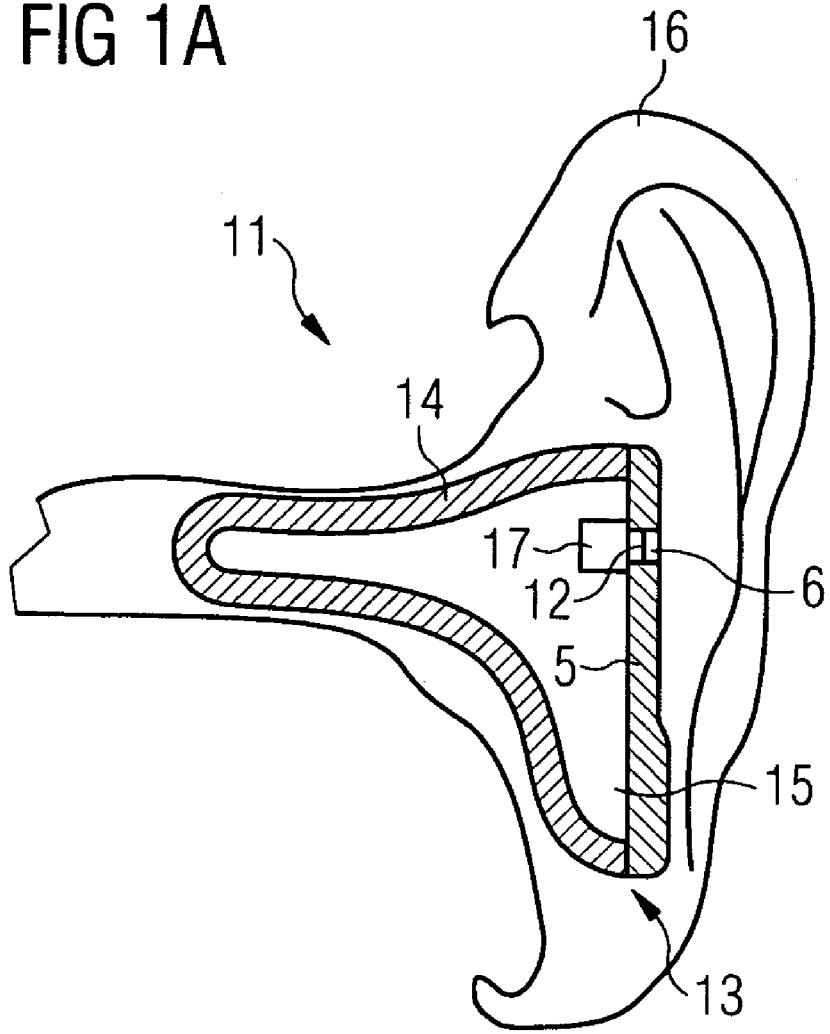
FIG. 1a: shows a cross-section through an in-the-ear hearing device.

FIG. 1a shows a cross-section through an inventive in-the-ear hearing device 11 with a hearing device housing 13, which is inserted in the ear 16 of the hearing device wearer. The hearing device housing 13 comprises a housing shell 14 to which is connected a front plate 5, said front plate being arranged facing the opening of the concha of the ear 16. A hearing device electronic system (not shown) is integrated in the space 15 formed by the housing shell 14 and the front plate 5. The front plate 5 has a microphone opening 6 to allow sound to pass through. A microphone 17 is arranged in the space. The microphone is bonded to the front plate 5. The microphone 17 sits precisely below the sound outlet opening 6. A semicylindrical second notch 12 can be seen in the microphone opening 6.

Figure 1B:
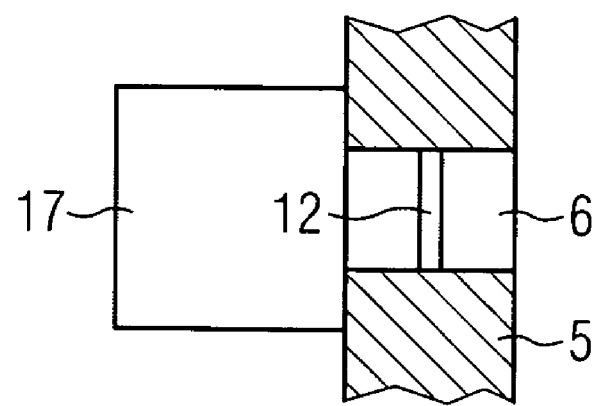
FIG. 1b: shows an enlarged view of the detail from FIG. 1.

FIG. 1b shows an enlarged view of the microphone opening 6 from FIG. 1a. The microphone 17 is attached to the underside of the partially shown front plate 5 beneath the microphone opening 6, for example bonded thereto. The second notch 12 for receiving a sealant in a form-fit manner can clearly be seen. The second notch 12 is integrated in the inner wall of the microphone opening 6.

Figure 2:
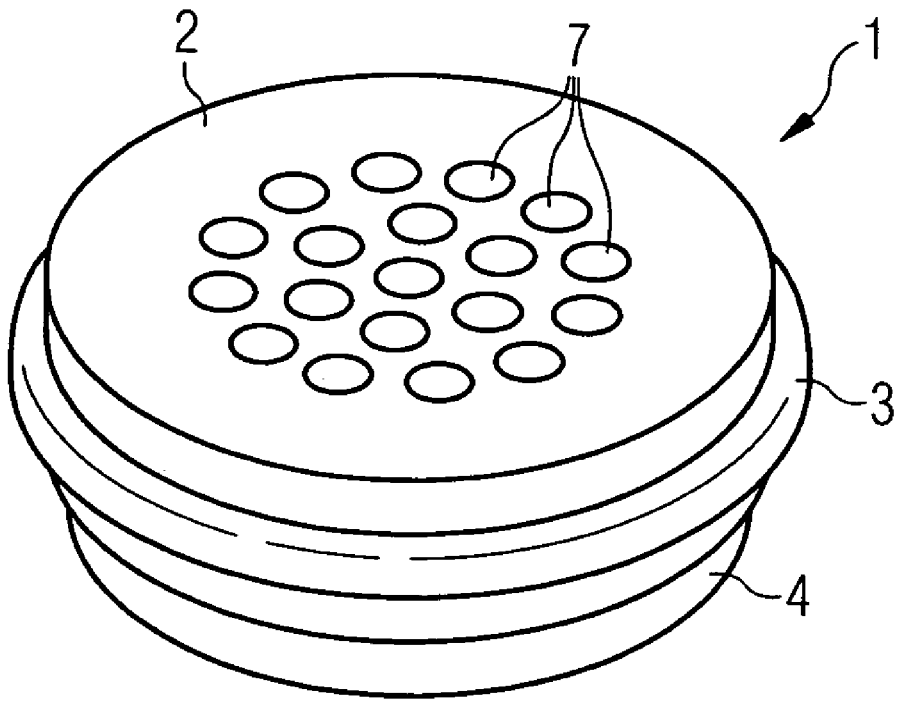
FIG. 2: shows a perspective view of a sealing apparatus.

FIG. 2 shows a perspective view of a sealing apparatus 1 according to the invention. The sealing apparatus 1 comprises a circular-cylindrical covering medium 2 on the cylinder wall of which is fixed a toroidal sealant 13. The covering medium 2 has a large number of holes 7 through which the sound can travel unimpeded. A water-repellent, sound-permeable membrane 4 is bonded on the underside of the covering medium 2. The bonding is preferably only present around the edge of the membrane so as not to impair the conduction of sound.

The sealant 3, which is made of a second material, for example silicon, together with the covering medium 2, which is made of a first material, is preferably made in a known two-component injection molding method.

Figure 3:
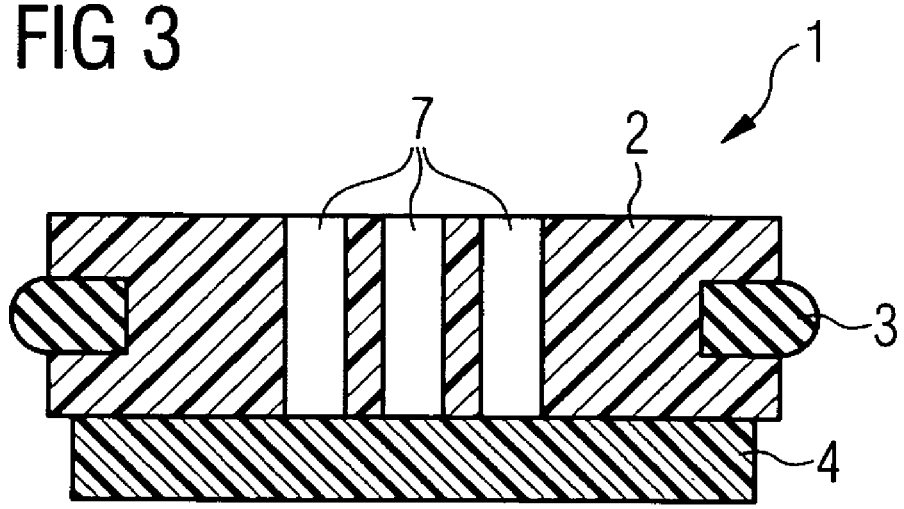
FIG. 3: shows a cross-sectional view of a sealing apparatus.

FIG. 3 shows a cross-section through the sealing apparatus 1 from FIG. 2. It is possible to see the covering medium 2 with the channels of the openings 7 to allow sound to pass through, as well as the sealant 3 that is affixed to the covering medium 2, and the bonded-on membrane 4. The sealant 3 is introduced in a first notch in the cylindrical outer surface of the covering medium 2.

Figure 4:
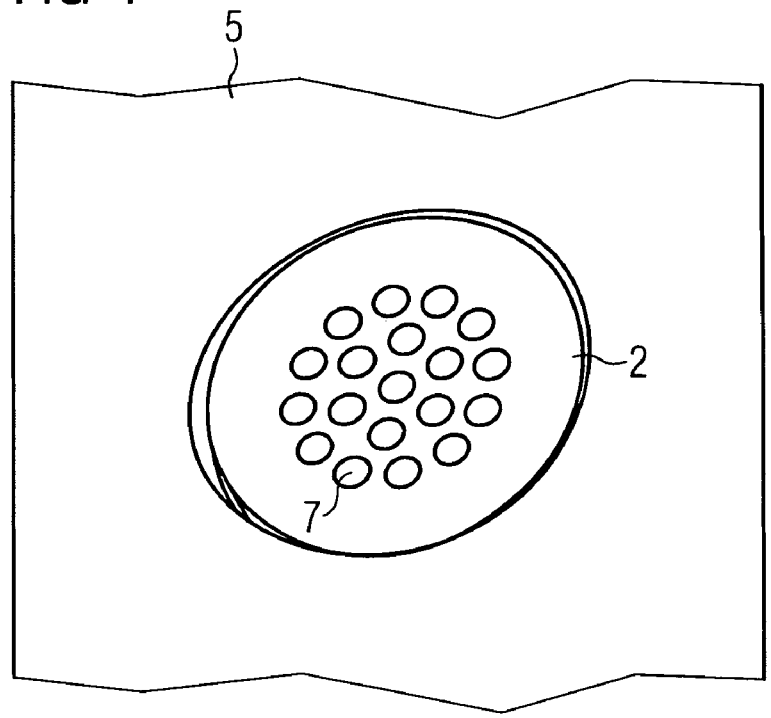
FIG. 4: shows a perspective view of a sealing apparatus built into a front plate.

The sealing apparatus 1 of FIGS. 2 and 3 is shown built into a front plate 5 in FIG. 4. It is possible to see the outside of the covering medium 2 with the integrated openings 7 in the form of end-to-end holes. The sealing apparatus 1 can finish planar with the surface of the front plate 5 or can have a slight step. The sealing apparatus 1 can be affixed to the front plate 5 by means of screwing or a snap-fit seal. The connection is designed so that, as a result of the sealant 3, no moisture can reach the interior 15 of the housing shell 13 (see FIG. 1a).

Figure 5:
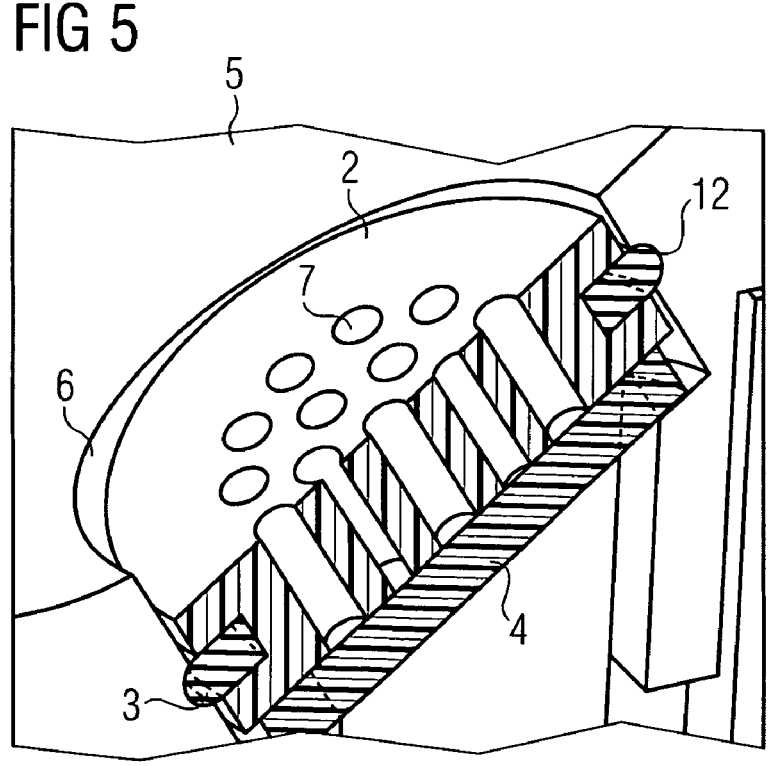
FIG. 5: shows a cross-sectional view of a sealing apparatus built into a front plate.

FIG. 5 shows the principle of this sealing in more detail. The Figure shows a partial view of a cross-section through an inventive sealing apparatus 1 that is fitted into a front plate 5. The sealant 3 that is integrated in the covering medium 2 fits in a form-fit manner into a striated second notch 12 in the microphone opening 6. This results in a seal that blocks out moisture. A water-repellent membrane 4 that seals the openings 7 in the covering medium 2 can be seen on the underside.

Figure 6:
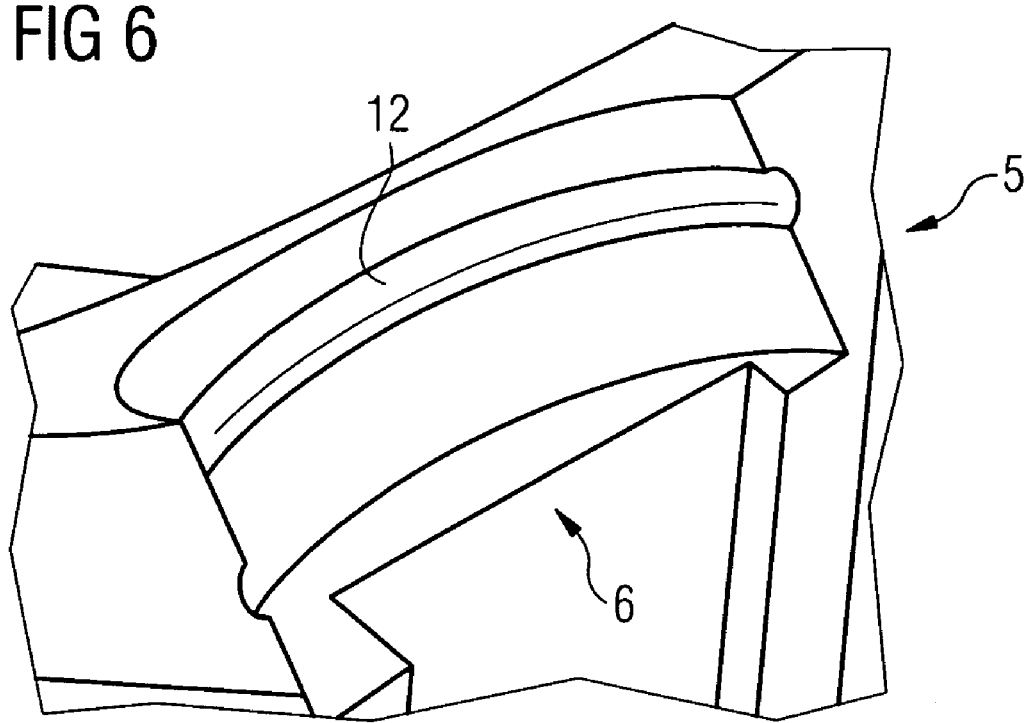
FIG. 6: shows a cross-sectional view through a microphone opening.

FIG. 6 shows a cross-section through a front plate 5 at the location of the microphone opening 6. A striated second notch 12 is introduced on the inside of the microphone opening. The sealant 3 of the sealing apparatus 1 from FIG. 5 fits into said notch 12 in a form-fit manner.

Figure 7:
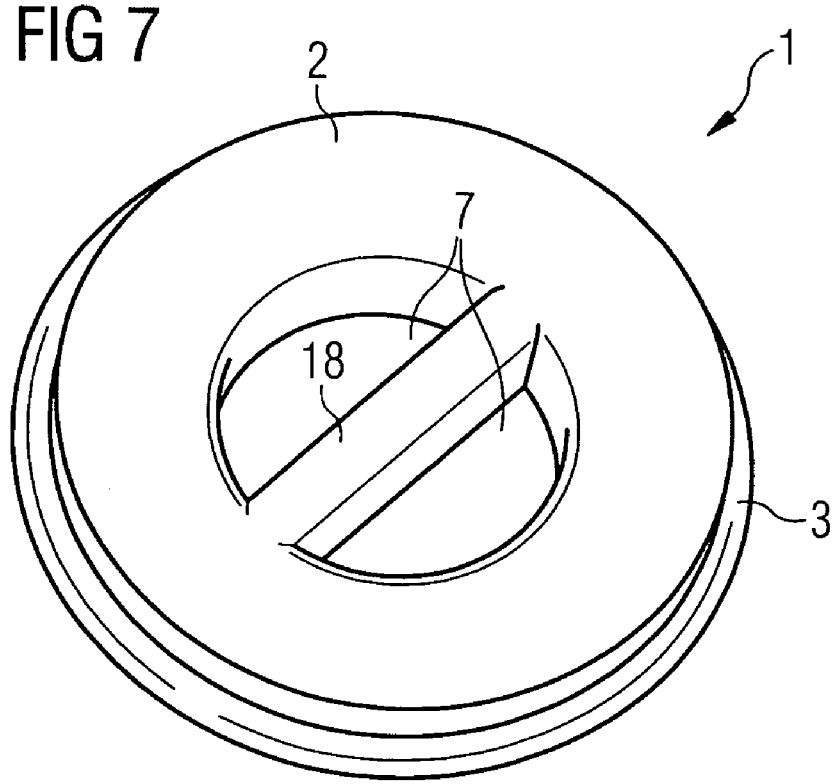
FIG. 7: shows a perspective view of a further sealing apparatus.

A perspective view of a further embodiment of the sealing apparatus 1 according to the invention is shown in FIG. 7. Instead of the many holes in the covering medium 2, only two semi-circular openings 7 for allowing sound to pass through are provided. The two openings 7 are separated by a bar 18. The bar 18 can be used for attaching a tool for removing and fitting the sealing apparatus 1. The bar 18 also facilitates the secure attachment of a membrane 4 (not shown in FIG. 7) on the underside 10 of the covering medium. The sealant 3 that is affixed on the cylinder-shaped edge of the covering medium can clearly be seen.

Figure 8:
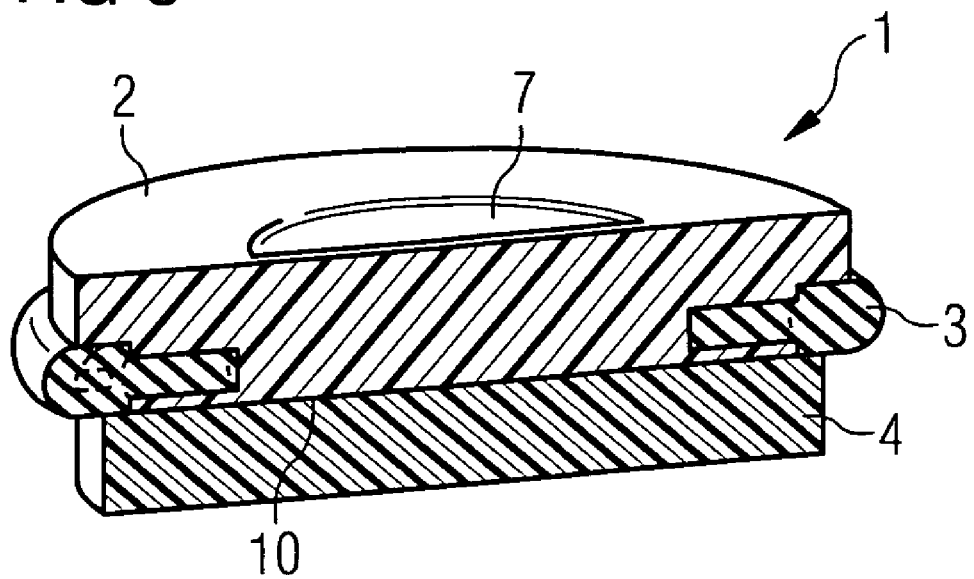
FIG. 8: shows a cross-sectional view of a further sealing apparatus.

FIG. 8 shows a cross-section through the sealing apparatus 1 from FIG. 7. The opening 7 in the covering medium 2, as well as the sealant 3 and the membrane 4 affixed to the underside 10, are visible.

Figure 9:
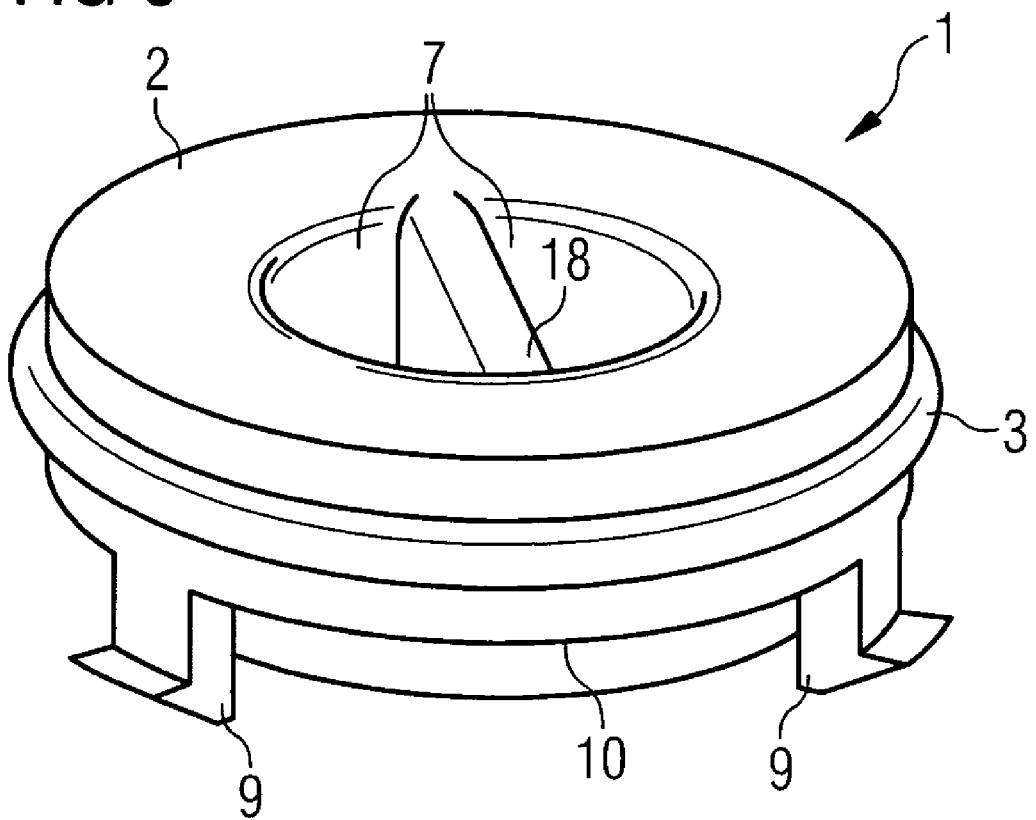
FIG. 9: shows a sealing apparatus with snap connectors.

Fixing means are required in order to securely hold the sealing apparatus 1 in a front plate 5. This can be provided for example by means of a thread on the outer wall of the covering medium, which engages in an internal thread of the microphone opening 6. FIG. 9 shows a further solution with a snap seal. Here the sealing apparatus 1 from FIGS. 5 and 6 has one or several snap connectors 9 on the underside 10 of the covering medium 2. The snap connectors 9 engage with one or several corresponding projections or with corresponding indentations in the front plate 5 (not shown in FIG. 9). The openings 7 and the sealant 3 can also be seen.

The invention claimed is:

1. A sealing apparatus for a microphone opening of a front plate, comprising:
   a sound-permeable covering medium made of a first material;
   a sound-permeable membrane adhered to a underside of the sound-permeable covering medium; and
   a seal arranged on an exterior of the sound-permeable covering medium, the seal surrounds the sound-permeable covering medium and protrudes from the sound-permeable covering medium to form a sealing ring, the seal is connected inseparably to the sound-permeable covering medium, and the seal is formed of a second material so as to produce a tight form fit between the sound-permeable covering medium and the front plate when the sound-permeable covering medium is inserted into the microphone opening.

2. The sealing apparatus as claimed in claim 1, wherein the form fit is air-tight and water-tight and the membrane is made of a microporous and water-repellent material.

3. The sealing apparatus as claimed in claim 2, wherein the sound-permeable covering medium is circular-cylindrical in shape.

4. The sealing apparatus as claimed in claim 3, wherein the second material is silicon.

5. The sealing apparatus as claimed in claim 4, wherein the sound-permeable covering medium has a first notch for receiving the seal.

6. The sealing apparatus as claimed in claim 5, wherein the sound-permeable covering medium has a plurality of openings running through it from the topside to the underside.

7. The sealing apparatus as claimed in claim 6, wherein the sound-permeable covering medium has an external thread or a snap connector on its underside for affixing in the microphone opening.

8. A hearing device, comprising:
a front plate having a microphone opening;
a microphone device arranged in cooperation with the microphone opening;
a sealing apparatus as claimed in claim 1 inserted into the microphone opening.

9. The sealing apparatus as claimed in claim 6, wherein the plurality of openings consists of two semi-circular openings.

10. The sealing apparatus as claimed in claim 1, wherein the two openings are separated by a bar configured to be attached to by a tool for removing and/or fitting the sealing apparatus.

11. The sealing apparatus as claimed in claim 1, wherein the sealing apparatus is flush or substantially flush with the front plate.

* * * * *